United States Patent
Howard

(10) Patent No.: US 6,462,826 B1
(45) Date of Patent: Oct. 8, 2002

(54) MEASUREMENT OF BRIGHTNESS, FLOW VELOCITY AND TEMPERATURE OF RADIANT MEDIA

(75) Inventor: John Howard, Australian Capital Territory (AU)

(73) Assignee: Australian National University, Acton (AU)

( * ) Notice: Subject to any disclaimer, the term of this patent is extended or adjusted under 35 U.S.C. 154(b) by 0 days.

(21) Appl. No.: 09/462,981

(22) PCT Filed: Jul. 16, 1999

(86) PCT No.: PCT/AU98/00560
§ 371 (c)(1),
(2), (4) Date: Mar. 6, 2000

(87) PCT Pub. No.: WO99/04229
PCT Pub. Date: Jan. 28, 1999

(30) Foreign Application Priority Data

Jul. 16, 1997 (AU) ............................... P07909

(51) Int. Cl.[7] ................................................. G01B 9/02
(52) U.S. Cl. ..................................................... 356/491
(58) Field of Search ................................. 356/453, 491

(56) References Cited

U.S. PATENT DOCUMENTS

| | | | |
|---|---|---|---|
| 3,700,902 A | 10/1972 | Buchan | |
| 4,320,973 A | 3/1982 | Fortunato et al. | |
| 4,905,169 A | * 2/1990 | Buican et al. | 356/453 |
| 5,774,215 A | 6/1998 | Padgett et al. | |
| 5,841,536 A | * 11/1998 | Dimmick | 356/453 |

FOREIGN PATENT DOCUMENTS

| | | |
|---|---|---|
| GB | 2 106 665 A | 4/1983 |
| JP | 07027613 A | 1/1995 |
| WO | WO 95/02171 | 1/1995 |

OTHER PUBLICATIONS

Stenflo, J.O., "Solar magnetic and velocity–field measurements: new instrument concepts," (1984) *Applied Optics* 23:1267–1278.

Gault, W.A. et al., "ERWIN: an E–region wind interferometer," (1996) *Applied Optics* 35(16):2913–2922.

Thuillier, G. and Hersé, M., "Thermally stable field compensated Michelson interferometer for measurement of temperature and wind of the planetary atmospheres," (1991) *Applied Optics* 30(10):1210–1220.

* cited by examiner

Primary Examiner—Samuel A. Turner
(74) *Attorney, Agent, or Firm*—Greenlee, Winner and Sullivan, P.C.

(57) ABSTRACT

A method and apparatus for measurement of at least one of brightness, flow velocity and temperature of radiant media are provided. A substantially collimated beam of light having a selected frequency is directed to a linear polariser. The linearly polarised output is directed to an electro-optically active birefringent crystal to separate the output into two characteristic waves and to introduce a first fixed phase delay between the characteristic waves. The birefringent crystal is selectively electro-optically modulated to introduce a second variable phase delay between the characteristic waves and the characteristic waves are combined to interfere prior to detection.

15 Claims, 5 Drawing Sheets

MEASUREMENT OF BRIGHTNESS, FLOW VELOCITY AND TEMPERATURE OF RADIANT MEDIA

FIELD OF THE INVENTION

This invention relates to the measurement of at least one of brightness, flow velocity or temperature of radiant media In one particular application the invention relates to measurement of the brightness, flow velocity and temperature of optically thin radiant media such as high and low temperature plasma discharges, flames, aurora, solar corona etc. In other applications the invention can, for example, be used to measure temperature of black body radiators such as furnaces, smelters and the like.

BACKGROUND ART

Standard spectroscopic methods for measuring flow speeds and temperatures of excited atoms or ions utilize grating spectrometers for dispersion of the emission spectrum together with intensified CCD detector arrays to resolve the emission line profile. Numerical fitting of the data allows estimates of the Doppler shift of the emission line due to the bulk flow velocity and spectral broadening due to the temperature of the source.

An instrument measurement of solar velocity and magnetic fields has been proposed by Stenflo (Applied Optic, 23:1267–1278, 1984). The Stenflo spectrometer obtains a phase delay $\phi_0$ using a beamsplitting cube to separate the component polarizations and different thicknesses of glass to relatively delay these waves. Wavelength specific quarter wave plates are used to return the separated beams in such a way that they traverse a path orthogonal to the incident path. Modulation is achieved using a fixed-frequency photoelastic modulator (PEM) which is a stand alone commercially available component. A half wave plate is used to tune the phase offset $\phi_0$.

The Stenflo instrument contains at least ten independent optical components five of which are wavelength specific. This presents serious practical limitations to the use of the instrument. Additionally the Stenflo instrument has not been proposed for the measurement of source temperature. Although the Stenflo instrument could be used for temperature measurement the light wavefront separation at the beamsplitter can introduce relative phase disturbances which, upon recombination of the beams, will reduce the ultimate temperature resolution.

DISCLOSURE OF THE INVENTION

It is an object of this invention to provide an improved method and apparatus for measurement of the brightness, flow velocity and temperature of radiant media.

The present invention proceeds from a recognition that the low order spectral moments of the line-of-sight integrated emission from excited atoms or ions are related by the Radon transform to moments of the species velocity distribution. The light emission integrated along some line-of-sight L as a function of emission frequency $\nu$ is represented by $$g(\nu) = \int_L I(r, \hat{l}, \nu) dl \quad (1)$$

where $\hat{l}$ is the unit vector in the direction of view. The zeroth spectral moment is simply $g(\nu)$ integrated over frequency $\nu$ and is proportional to the number of emitting particles along the line-of-sight. The first spectral moment (spectral shift) measures the intensity weighted component of the bulk flow velocity in the direction of and integrated along the viewing line. The second moment (spectral width) is proportional to the intensity weighted temperature of the emitting species. The line integral measurements can be inverted tomographically to give the spatial distribution of the emission, the flow vorticity and the temperature of the source.

For the special case of a gas or plasma in thermal equilibrium, the velocity distribution of the atoms or ions is described wholly in terms of its three lowest order moments.

Accordingly, in one aspect this invention provides an apparatus for measurement of brightness, flow velocity and temperature of radiant media including means to direct a substantially collimated beam of light having selected frequency from said media to a linear polariser;

an electro-optically active birefringent crystal to separate a linearly polarised output of said polariser into two characteristic waves and to introduce a first fixed phase delay between the characteristic waves;

means to selectively electro-optically modulate said birefringent crystal to introduce a second variable phase delay between said characteristic waves; and means to combine said characteristic waves to interfere.

Preferably, the birefringent crystal is arranged with its propagation axes at 45° to the polarisation of the input so that substantially equal characteristic waves are transmitted.

The characteristic waves are preferably combined using a further linear polariser.

A further tuning crystal can, when required, be introduced between the birefringent crystal and the means to combine in order to adjust the amount of first fixed delay.

In a development of the invention two such tuning crystals can be introduced in series and mutually oriented at 45° or rotated at a selected rate perpendicular to its optical axis so as to provide a scanning of the delay range. In this application the apparatus can be used as a limited fourier transform spectrometer.

Preferably the birefringent crystal is a Lithium Niobate crystal. Other suitable crystals include BBO and KTP.

The apparatus of this invention preferably further includes means to detect the combined characteristic waves and means to sample the wave at an interval of one quarter of the modulation period of the birefringent crystal to produce a digitised signal from which the emission moments of the radiant media can be recovered algebraically.

In a second aspect this invention provides a method for measurement of brightness, flow velocity and temperature of radiant media including the steps of linearly polarising a substantially collimated beam of light having selected frequency from said radiant media;

separating said polarised beam into two characteristic waves and introducing a first fixed phase delay between said characteristic waves;

introducing a second modulated variable phase delay between said characteristic waves of frequency $\Omega$ and amplitude $\pi/2$; and combining said characteristic waves and sampling the combined wave at an interval of one quarter of the modulation period to produce a digitised signal from which the emission moments of the radiant media can be recovered.

Preferably, a birefringent element is used to introduce the fixed delay. More preferably, an electro-optically active birefringent crystal is used to introduce both the fixed delay and the variable delay.

Preferably, the emission moments are recovered using isolating time domain filters.

As used in this specification the term "light" is intended to include ultraviolet and infrared radiation as well as light in the strictly visible spectrum.

In accordance with the method of this invention a novel processing algorithm is employed for demodulating signals from the apparatus. It relies on synchronously digitizing the modulated signal at four times the modulation rate. It has the advantage that it can be easily adapted for time-domain demodulation using the host computer or digital signal processor (DSP) technology. Signals carried at harmonic components of the modulation frequency, normally lost in standard demodulation methods, are aliased to lower frequencies in the digital approach, with a consequent increase in signal to noise ratio over methods which isolate the harmonic carriers separately. An alternative simple binary modulation scheme is also possible. This will require the use of two detectors, but has the advantage of conceptual simplicity and also halves the drive voltage amplitude (typically ~500 Volts).

Many of the advantages of the invention flow from the use of an electro-optical birefringent crystal to simultaneously provide a large electrically-tunable dc phase shift $\phi_0$ and a modulation component of variable frequency and adjustable amplitude $\phi_0$. The modulation can be sinusoidal (for single detector applications) or binary (requiring two detectors) with resulting post processing simplifications. These advantages include:

The present invention requires only a single wavelength-specific component—the interference filter, compared with five in the Stenflo prior art device.

The number of independent optical components required is four rather than the ten of the Stenflo prior art device.

The modulation frequency in the present invention can be user selected—it is not fixed by the resonant photo-elastic effect as in prior art devices.

The present invention avoids the problem of the Stenflo device in relation to beamsplitter introduced relative phase disturbances which limit the ultimate temperature resolution of that instrument.

Some further advantages of the present invention include:
1. A single detector, for example, a photomultiplier tube only is required to simultaneously recover the three lowest order spectral moments.
2. The instrument is low cost. In experimental applications, this will allow a number of spectral lines to be monitored routinely—a prohibitively expensive option using dispersive spectrometers and detector arrays.
3. The apparatus of the present invention is robust (non-critical alignment) and compact. The modular system design allows the spectrometers to be combined for simultaneous multiple applications. For example, for plasma emission in coronal equilibrium and with the appropriate choice of interference filters and coupling optics, the instrument can be configured for sensitivity to electron temperature.
4. The modulation frequency can be selected to match some characteristic system frequency (e.g. to study wave phenomena) to allow the application of synchronous detection techniques.
5. Additional birefringent crystals can be inserted with axes either aligned with the modulating crystal (additive), or orthogonal (subtractive), to allow gross adjustment of the phase delay $\phi_0$. This is useful for applications exhibiting a wide range of temperatures.
6. The apparatus of the invention typically uses a 25 mm aperture which allows, with some modification of the detection scheme, the multiplexing of spatially distinct information larger apertures can be used in imaging applications.
7. The Zeeman effect (important for magnetized media) can be readily measured with the insertion of appropriate polarizing optics between the source and the spectrometer.

In the preferred form the instrument of this invention will be supplied with a PC card having computer controlled onboard oscillator, digitizer clock signal, filters and adc(s). The card will come with a graphical interface software package necessary for operation, control and demodulation. Some of the features of the combined system are:

Operation in oscillatory or binary modulation modes.

Possibility for continuous time monitoring for process control. Fixed data records can also be recorded and post processed by the PC.

User-controllable modulation frequency

Photomultiplier tube sensitivity control

As output, the PC card will provide
1. Low voltage supply for modulator.
2. Master oscillator signal (set by user)
3. Adjustable high voltage for photomultiplier.

The low voltage supply, together with the oscillator signal will be used to provide a switchable high voltage for modulation of the electro-optic crystal. An independent computer controllable supply could be provided for the photomultiplier tube detectors. If required, the high voltage could be slaved to ensure optimum use of the ADC dynamic range.

Inputs to the card will be the photodetector signals. These will be digitized synchronously as described above and processed by the computer.

Some embodiments of the invention will now be described, by way of example only, with reference to the accompanying drawings.

BEST MODES FOR CARRYING OUT THE INVENTION

The invention is based upon the principle of the Fourier transform spectrometer (FTS). As such, it offers high optical throughput, can be adapted easily for multiple spatial channels, and because the line is not spectrally resolved, time resolution is not compromised by having to integrate and sequentially read-out a multi-element CCD array. Moreover, depending on the dominant noise source, the signal to noise ratio compared with that for a dispersive spectrometer, is improved by the Fellgett advantage. This arises from the fact that the signal is being received from the entire spectrum, while for a dispersive instrument such as a grating spectrometer, the signal is received from just a single spectral element at any given time.

The intensity at the output port of the FTS is proportional to $$S_\pm = \int_0^\infty g(p, \phi : \nu)[1 \pm \cos(2\pi \nu \tau)]d\nu \quad (2)$$

where T is the time delay resulting from the interferometer path length difference. By scanning T, it is possible to perform an inverse cosine transform to recover the full source spectrum. The principal difficulty with the standard optical FTS is its sensitivity to acoustic noise due to the separation of light wavefronts. This can be overcome using solid state optical components. For example, low resolution optical spectra can now be recorded using a FTS constructed around a Wollaston prism and image plane detector array. For gases or plasmas in local thermal equilibrium, however, the spectrum can be characterised by its three lowest order moments alone. The local emission spectrum is given by $$I(r, \hat{l}; \nu) = \frac{I_0(r)}{\sqrt{2\pi} \nu_0 \delta(r)} \exp\left[-\frac{(\nu - \bar{\nu})^2}{2\nu_0^2 \delta^2(r)}\right] \quad (3)$$

where r is a position in the medium, and $I_0(r)$ is the local emission intensity (zeroth moment). The species temperature (second moment) is given by $kT_s(r)/(m_s c^2)=\sigma^2(r)$ where $m_s$ is the atomic weight. The Doppler-shifted line centre frequency (first moment) is $\hat{\nu}(r, \hat{l})=\nu_0+\Delta\nu_D (r, \hat{l})$ where $\nu_0$ is the rest frame frequency and $\Delta\nu_D (r, \hat{l})/\nu_0=\underline{\nu}_D(r)\cdot\hat{l}/c\equiv\beta_D (r)\cdot\hat{l}$ where $\nu_D$ is the gross flow velocity of the emitting species.

The present invention aims to recover only these three lowest order quantities.

Figure 1:
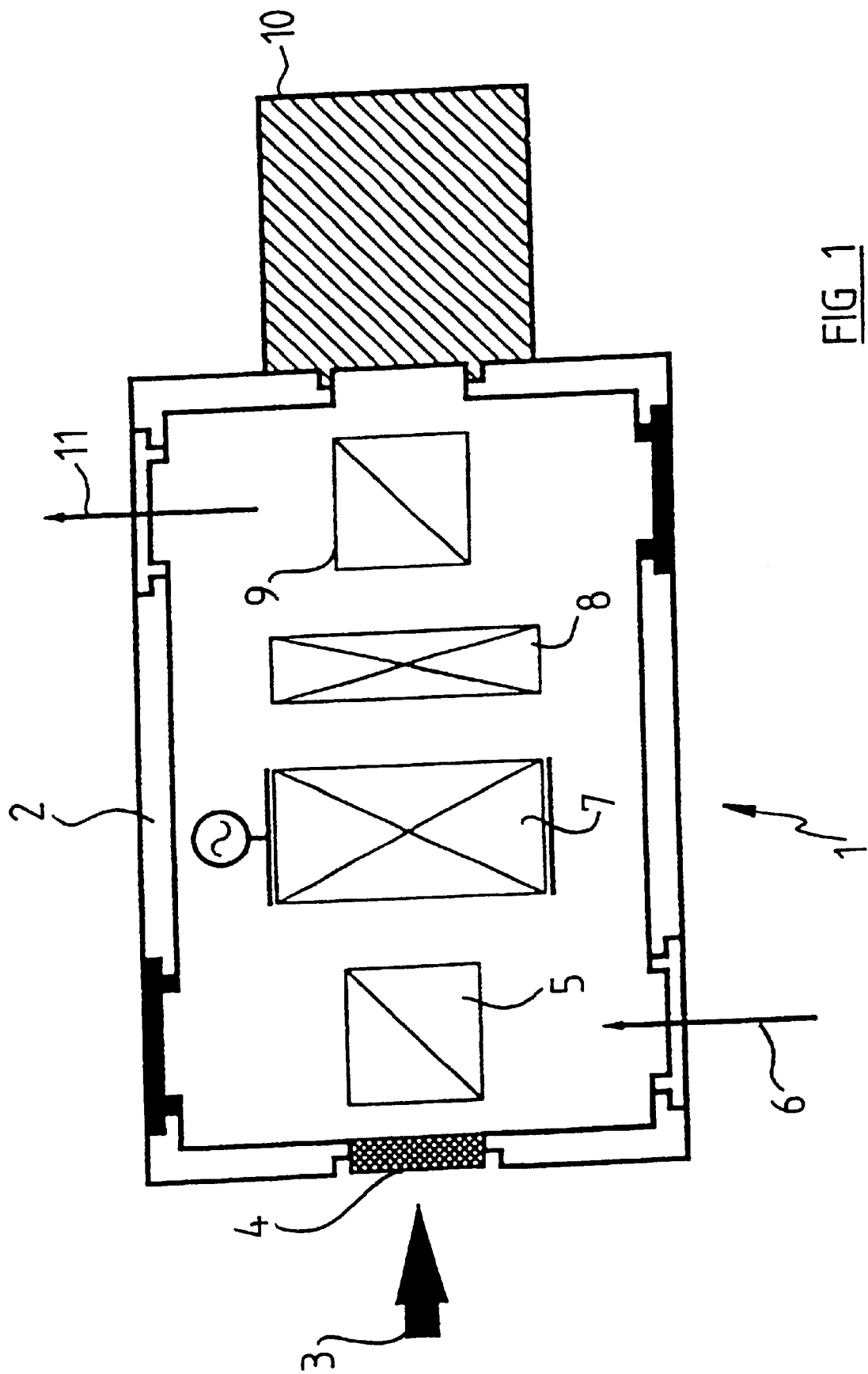
FIG. 1 is a schematic drawing of the optical layout of an apparatus for measuring brightness, flow velocity and temperature of a radiant source according to this invention.

Referring to FIG. 1 the apparatus 1 for measuring brightness, flow velocity and temperature includes a solid light-tight enclosure 2 which houses the optics and has a number of apertures for input and output of various light beams. Light illustrated by arrow 3 enters the apparatus 1 through an interference filter 4 that transmits the desired emission line. A first polarizing cube 5 transmits the horizontally polarized component of the input light. The reflected component can be absorbed or relayed to another device, for example another similar detector. The orthogonal port of the polarizing cube 5 can be introduced an additional light source, for example, a calibration laser light source shown by arrow 6. The polarized light transmitted by cube 5 traverses a birefringent crystal 5, for example an X or Y-cut LiNbO$_3$, with birefringence B=0.1 whose fast axis is at 45° to the plane of polarization. This introduces a phase delay $\phi_0=\pi\nu_0 BL/c=2\pi\nu_0 T_0$ between the orthogonal characteristic waves. An additional small delay modulation $\omega_1={}_1\sin(\Omega t)$ of amplitude $\phi_1=\pi/2$ is obtained by electro-optically modulating the crystal 7 at a frequency away from any acoustic resonant frequency. It is also possible to apply a dc offset field to fine tune the dc phase delay $\phi_0$. The light is passed through a tuning crystal 8 and then again polarized using a beamsplitter cube 9 to allow the independent components to interfere on a photomultiplier detector 10 intercepting the transmitted beam. The reflected beam 11 can also be similarly detected if required for various applications.

Figure 2:
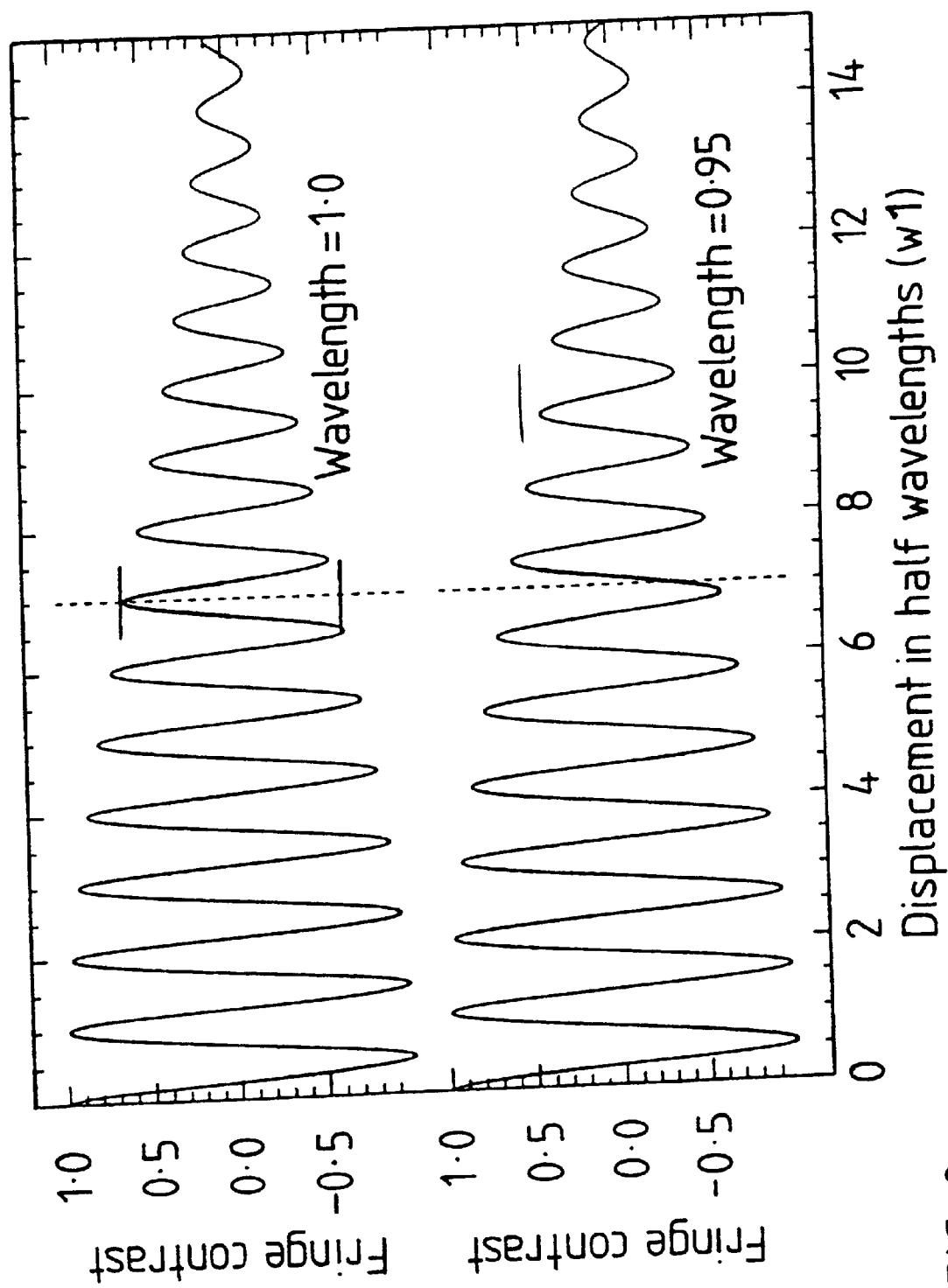
FIG. 2 shows simulated interferograms of the output of the apparatus of FIG. 1.

Effectively only the three lowest order moments are measured by the instrument. FIG. 2 illustrates simulated interferograms showing the effect on the interferogram of a change in line centre frequency (exaggerated for clarity). The path length is modulated as described above about an initial path offset (or operating point) $\phi_0$ that is sufficiently large to accentuate small changes in line centre frequency (the accordion effect). The dashed vertical line in FIG. 2 corresponds to the delay introduced by the birefringence crystal while the bold section is the portion of the interferogram swept by the electro-optic modulation. Line centre shifts are conveyed as a change in the ratio of even and odd harmonics generated by the modulation. The signal modulation depth (or fringe visibility) gives an estimate of the species temperature, while the dc level is proportional to the source brightness. This information is available using a single detector and at a bandwidth chosen to conform with the application demands.

A number of possibilities based on either analog or digital means are available for signal demodulation. For simplicity, it is assumed that the medium is uniform so that the line integral can be ignored. In this case, Eqs. (1), (2) and (3) can be combined to give $$S_\pm = I_0\{1 \pm \eta \cos[\overline{\omega_0}+\omega_1 \sin \Omega t]\} \quad (4)$$

Here $\phi_0=\phi_0(1+\beta_D)$ is proportional to the phase offset $\phi_0$ introduced by the birefringent plate, $\Omega$ is the modulation angular frequency and $\phi_0=\pi/2$ is the small modulation amplitude (see FIG. 2). $I_0$ is the emission intensity (zeroth moment), $\beta_D=\nu_D/C$ is proportional to the species flow velocity (first moment) and the fringe visibility $\eta$ is related to the species temperature (second moment)

$$\eta=\exp[-\gamma T_s]. \quad (5)$$

Where $\gamma$ is a constant proportional to $\phi_0^2$. The aim is to record this signal in a way that makes straightforward the recovery of the three low order quantities $I_0$, $T_s$ and $\beta_D$.

The cosine of the sinusoidal modulation generates a spectrum of harmonics of $\Omega$ as can be seen from the Bessel function expansion:

$$\cos[\overline{\varphi_0} + \varphi_1 \sin\Omega t] = \cos\overline{\varphi_0}\left[J_0(\varphi_1) + \sum_{n=1}^{\infty} 2J_{2n}(\varphi_1)\cos 2n\Omega t\right] - \sin\overline{\varphi_0}\left[\sum_{n=0}^{\infty} 2J_{2n+1}(\varphi_1)\sin(2n+1)\Omega t\right]. \quad (6)$$

For appropriate choices of $\phi_0$ and $\phi_1$ the signals at the outputs of bandpass filters tuned to harmonics of $\Omega$ will give the zeroth and first spectral moments and the visibility $\eta$. By not using information carried by all of the harmonic carriers, however, this approach does not fully utilize all of the available signal energy.

A simple digital approach to demodulation is to sample either or both of the signals S± at times t=0, T/4, T/2, t/4, . . . where T=$2\pi/\Omega$ is the modulation period. All odd harmonics of $\Omega$ are then aliased to the centre of the passband and the even harmonics to the edges. In this process, no information at harmonics of the carrier frequency is lost. This allows simple time domain filters to be employed for signal extraction.

The digitized signal D can be represented as $$D\pm(t)=1/\tau III(t/\tau)S\pm(t) \quad (7)$$

where III(t)=$\Sigma_n\delta$(t−n) is the sampling comb and $\tau$=T/4 is the sampling interval. Taking the Fourier transform, using Eq. (6) and noting that III is its own Fourier transform gives $$D_\pm = \varepsilon_0(w) \pm (2\pi)^2 \left[ \sum_n J_{2n}\delta(\omega - 2n\Omega) \right] * III(\omega) * \varepsilon(\omega) \pm \quad (8)$$

$$i(2\pi)^2 \left[ \sum_n J_{2n+1}\delta[\omega - (2n+1)\Omega] \right] * III(\omega) * O(\omega)$$

$$\epsilon_0(\omega) = F(I_0)$$

$$\epsilon(\omega) = F(I_0\eta \cos \overline{\omega_0})$$

$$O(\omega) = F(I_0\eta \sin \overline{\omega_0})$$

are the Fourier transforms of the carrier independent information and it has been assumed that $\Omega$ is larger than the information bandwidth. Convolution of the sampling and delta functions generates replicas (aliases) of the signal components at dc, and odd and even harmonics:

Applying numerical bandpass filters at dc, $\Omega$ and $2\Omega$ isolates the information. Inverse Fourier transformation recovers $$D_{dc} = I_0 + \tfrac{1}{2}I_0\eta \cos \overline{\phi_0}$$

$$D_{even} = \tfrac{1}{2}I_0\eta \cos \overline{\phi_0}$$

$$D_{odd} = I_0\eta \sin \overline{\phi_0}.$$

These quantities can be combined simply to recover the emission moments.

For low frequency applications ($\Omega/2\pi \leq 1$ kHz), the filtering tasks indicated can be accomplished in real time using the computer CPU. For high speed applications in which quasi real-time response is required, dedicated DSPs can be used to process the data stream. Alternatively, data records can be captured, stored and post-processed in software for later display.

In the case of a timing offset $\Delta t$ from the ideal quadrature sampling times, i.e. $t = \Delta t$, $\Delta t + T/4$, $\Delta t + T/2$, $\Delta t + t/4$, ..., the timing error is encoded as a complex weight at frequency $\Omega$ in the Fourier transform. This can be easily extracted and compensated in the processing algorithm.

The birefringent electro-optic crystal used in the preferred form of the invention is Lithium Niobate. Lithium Niobate is a man-made crystal that is birefringent, pyroelectric, piezoelectric, photoelastic, ferroelectric and electro-optic. This invention makes use of the birefringence and the linear electro-optic (Pockels) effect. The permittivity tensor can be represented by a 3×3 matrix $$\varepsilon_{ij} = \begin{bmatrix} \varepsilon_{11} & 0 & 0 \\ 0 & \varepsilon_{11} & 0 \\ 0 & 0 & \varepsilon_{33} \end{bmatrix} \quad (15)$$

The crystals for the present invention are Y-cut. This implies that the Y-axis is normal to the crystal face and the fast and slow axes correspond with respectively with the Z and X axes. The associated birefringence is significant $B = n_e - n_o \sim -0.1$.

The relationship between the refractive index and applied electric field can be written $$(\Delta(1/n^2))_{ij} = \sum_k r_{ijk} E_k$$

where $\Delta(1/n^2)_{ij}$ is the second rank tensor describing the change in relative permittivity, $E_k$ is the k-th component of the electric field and $r_{ink}$ is the linear electro-optic coefficient tensor (3rd rank, 27 elements). Given various symmetries, $r_{ink}$ can be reduced to the following 6×3 matrix $$r_{ijk} = \begin{bmatrix} 0 & -r_{22} & r_{13} \\ 0 & r_{22} & r_{13} \\ 0 & 0 & r_{33} \\ 0 & r_{42} & 0 \\ r_{42} & 0 & 0 \\ -r_{22} & 0 & 0 \end{bmatrix} \quad (17)$$

with the identifications $$jk = 11 \rightarrow 1 \quad jk = 22 \rightarrow 2$$

$$jk = 33 \rightarrow 3 \quad jk = 23, 32 \rightarrow 4 \quad (18)$$

$$jk = 31, 13 \rightarrow 5 \quad jk = 12, 21 \rightarrow 6$$

The present invention utilises the change in permittivity along the X (11) and Z (33) directions that can be induced by a voltage applied in the X-Z plane. Inspection of the tensor $r_{ijk}$ shows that an applied electric field parallel to the Z axis will result in changes $r_{13} E_3$ and $r_{33} E_3$ to the quantities $\Delta(1/n^2)_1$ and $\Delta(1/n^2)_3$ respectively.

The phase difference between fast and slow waves (free space wavelength $\lambda$) after passage through a lithium niobate crystal of thickness L is $\phi_0 = 2\pi LB/\lambda$. It is straightforward to show that the fractional phase change accompanying a small perturbation to the refractive index can be expressed as $\Delta\phi/\phi = n^2/2 \Delta(1/n^2)$. The phase difference resulting from the applied field $E_3 = V/d$, where V is the applied potential difference and d is the crystal width is then $$\Delta\varphi_0 = \frac{\pi L}{\lambda} [N_e^3 \Delta(1/n_e^2) - n_o^3 \Delta(1/n_o^2)] \quad (19)$$

$$= \frac{\pi L V \rho}{\lambda d}$$

EXAMPLE

Resolution and Sensitivity

The capabilities of the invention are illustrated for the particular case of a high temperature argon discharge in which emission from the 488 nm transition of singly ionized Argon is observed. This is the case for magnetically-confined rf-generated discharges in the H-1 heliac at the H-1NF National Plasma Fusion Research Facility at The Australian National University. The instrument parameters detailed here are those appropriate for the measurements made on H-1 NF.

Figure 3:
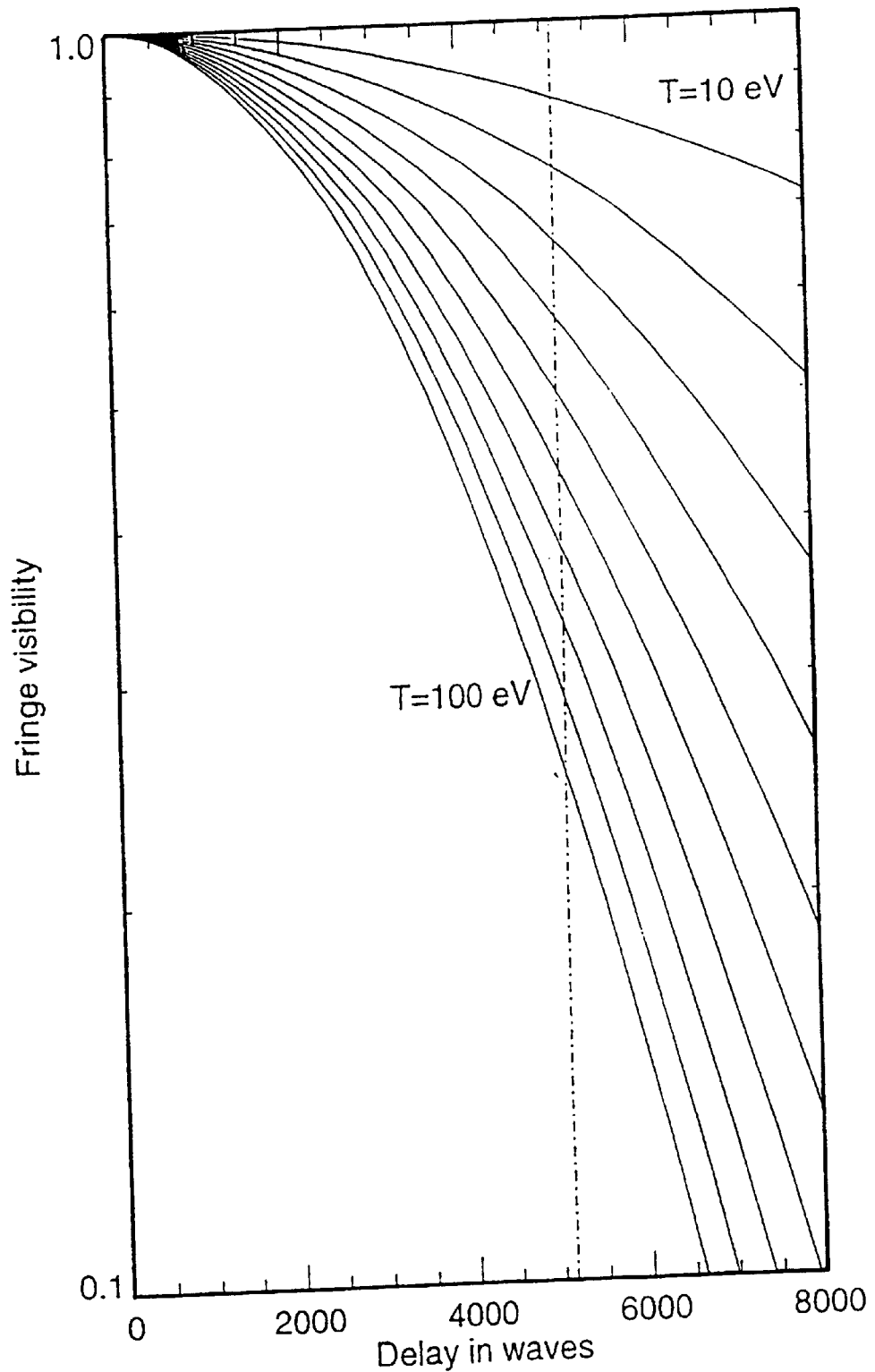
FIG. 3 is a plot of fringe contract versus FTS phase delay for a uniform plasma showing argon ion temperatures from 10 eV to 100 eV.

For simplicity, only Doppler broadening mechanisms and are considered and it is assumed that the plasma is a homogeneous and isotropic light source (this allows us to ignore the effects of line integration). The variation of fringe contrast $\exp(-\gamma T)$ (or coherence length) with phase delay $\phi_0$ for ion temperatures in the range 10 to 100 eV is shown in FIG. 3. The vertical line corresponds to the delay introduced by a $LiNbO_3$ crystal at 488 nm. A small change in ion temperature $\delta T_s$ gives a fractional change in the modulation depth $\delta n/n = -\gamma \delta T_s$. For the H-1NF system, $\gamma \approx 0.015$, so that a fringe contrast resolution of order 0.05 corresponds to temperature uncertainties of about 3 eV.

As well as questions of sensitivity, it is necessary to estimate the minimum measurable temperature. This is set by the divergence of rays through the birefringent crystal, the effect being to give fringe contrast less than unity, even in the absence of finite coherence length effects. Taking account only of geometric effects, a ray traversing the crystal at small angle $\theta$ to the surface normal incurs an incremental change in delay $\Delta\phi = \phi - \phi_0 = \phi_0 \theta^2/2$. For the H-1 spectrometer, $\Delta\theta \sim 0.01$ with an associated non-negligible phase increment $\Delta\phi = 1.6$ radians. To account for the spread of rays, the simple line integral Eq. (1) must be replaced by an integral over space and solid angle of rays collected from the plasma, including the effects of the detector response. As a first estimate of the effect, the emission is regarded as emanating from a point source at distance D from the detector and radiating into a cone of solid angle $\Delta\Omega = 2\pi(\Delta\theta)^2$ where $\Delta\theta = a/D$ and a is the effective radius of the detector aperture. Substituting for $\phi = \phi(\theta) = 2\pi v_0 \tau$ into Eq. (2) and integrating over this spread of angles gives $$S_\pm = \int_0^\infty g(p, \phi; v)[1 \pm \zeta \cos(2\pi v \tau)] dv \qquad (20)$$

where $\zeta = \text{sinc}(\phi_0 \Delta\theta^2/4\pi)$ is the instrumental maximum fringe contrast. Experimentally, the minimum measurable temperature is 20 eV—corresponding to a maximum fringe visibility of 75%. For a given ion temperature the maximum sensitivity to bulk ion motion occurs when $\gamma T_s = 0.5$. This optimum value is obtained because the increase in phase sensitivity with offset $\phi_U$ is counteracted by a decrease in fringe contrast. For the fixed delay birefringent crystal, this condition $T_s \approx 35$ eV. When $\gamma T_s = 0.5$ is satisfied, the minimum measurable change in the bulk flow speed is well approximated by $$\delta v_D = (\delta\eta/\eta) v_{th} \qquad (21)$$

INDUSTRIAL APPLICATION

Visible spectroscopy is a powerful passive remote-sensing tool used in all plasma devices, in areas of astronomy and materials physics and various industrial applications. An example of the latter is its use for monitoring heavy-metal concentrations in exhaust stack emissions.

The present invention is particularly well suited to the study of media in which knowledge of the time evolution of species temperature and flow are important. These quantities are, of course, of critical importance in fusion plasma research. Large systems involving dispersive spectrometer techniques are routinely employed to measure intrinsic or charge exchange recombination (CXR) emissions from heating or diagnostic neutral beams for the purpose of measuring ion temperature and flow. The present invention provides a robust low-cost alternative or complement to such systems.

Knowledge of atom and ion temperatures and flow velocities are also important in materials processing plasma devices. Presently, expensive laser induced fluorescence (LIF) systems are employed for this task. There also remains some concern about the perturbative effects of LIF. The present invention is an attractive alternative, especially in dc discharge devices where time integration could be used to increase signal to noise ratios.

The ability of the present invention to provide as real-time output the species brightness, flow and temperature can be used for feedback control of discharge parameters for process control.

The present invention is also useful in applications where the spectral emission is polarized, for example Zeeman effect and Motional Start Effect. Suitable polarization modulation techniques result in a modulation of the low order moments of the spectral emission. The apparatus of this invention senses these modulations as a shift in the carrier phase or a variation in the fringe contrast.

The polarization state of a Zeeman split multiplet, can be used to unambiguously orient the magnetic field in the region from which the emission originated. The pi components are spectrally shifted from the central sigma component and are circularly polarized when viewed along the magnetic field and transversely polarized when viewed across the field. The sigma component is polarized parallel to the magnetic field and vanishes when viewed along the field. A suitable polarization modulation applied to the Zeeman split multiplet before entering the apparatus of this invention will give rise to corresponding amplitude and phase modulations of the carrier signal. These arise because of changes respectively to the second and first moments of the spectrum transmitted to the apparatus due to the polarization modulation. The phase angles of these modulations yield the spherical angles (latitude and longitude) necessary to orient the magnetic field.

Motional Stark Effect is a very important diagnostic tool for high temperature plasmas. High energy, high current beams of neutral hydrogen or deuterium are used to fuel and heat magnetically confined plasmas.

The beam particles experience an induced electric field due to their motion across the background magnetic field. The electric field causes splitting of the Balmer transition radiation from excited beam neutrals. The polarization state of the emitted radiation contains information about the orientation of the local magnetic field. As for the Zeeman effect, this information can be obtained from the phase of amplitude and phase modulations of the carrier induced by appropriate polarization modulation techniques. The approach of this invention offers signal to noise ratio advantages while also allowing estimation of the magnetic field strength which is a parameter not available using standard methods.

Additionally, for multi-channel applications, it should be possible, using optical fibres and collimation optics, to image a large number of independent channels of information for example, from different spatial regions, through a single large aperture apparatus according to this invention. This greatly enhances the utility of the invention.

EXAMPLE

Measuring Electron Temperature

Two apparatus according to this invention can be effectively combined for the measurement of electron temperature using the intensity ratio method for line emission from atoms or ions of the same species and charge state. This method is valid for plasmas in coronal equilibrium. The method used here effectively converts this intensity variation to a phase shift. The measurement principle relies on the electron temperature dependence of the line emission intensity $$I(T_e) n_e n_s \exp(-\chi/kT_e)/\sqrt{(T_e)} \quad (22)$$

where $\chi$ is the transition excitation potential.

Figure 4:
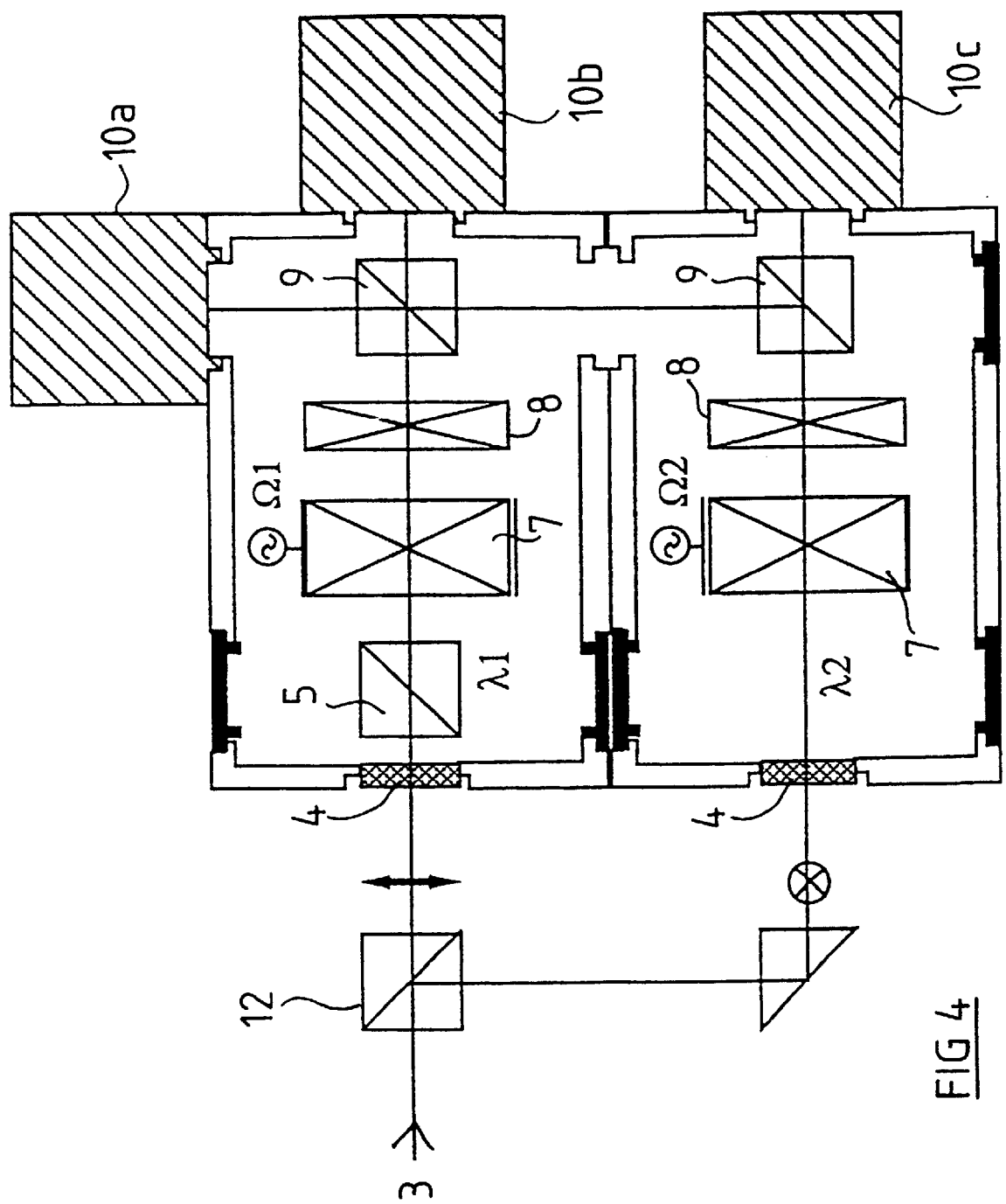
FIG. 4 is a schematic drawing showing two of the apparatus shown in FIG. 1 cascaded for sensing changes in election temperature.

The configuration of the modified apparatus is shown in FIG. 4 where the same reference numerals have been used to identify components corresponding to those shown in FIG. 1. The incident radiation 3 is separated by a polarizing beamsplitter 12 and directed to two units, each using a different interference filter 4 to select the transition wavelengths of interest, say $\lambda_1$ and $\lambda_2$. The signals for each transition can be processed in the usual way at detectors 10a and 10c to obtain the three lowest order velocity moments of the ion distribution function.

Detector 10b senses the combination of radiation from both wavelengths. When electron temperature changes, the relative intensities of the two transitions also changes. This gives a nett change to the first moment of the light received by detector 10b, with an associated phase shift $\phi_e$. It can be distinguished from the accompanying Doppler shift $\beta$ by modulating the two crystals 7 at different frequencies $\Omega_1$ and $\Omega_2$.

EXAMPLE

Confirming Thermal Equilibrium

Figure 5:
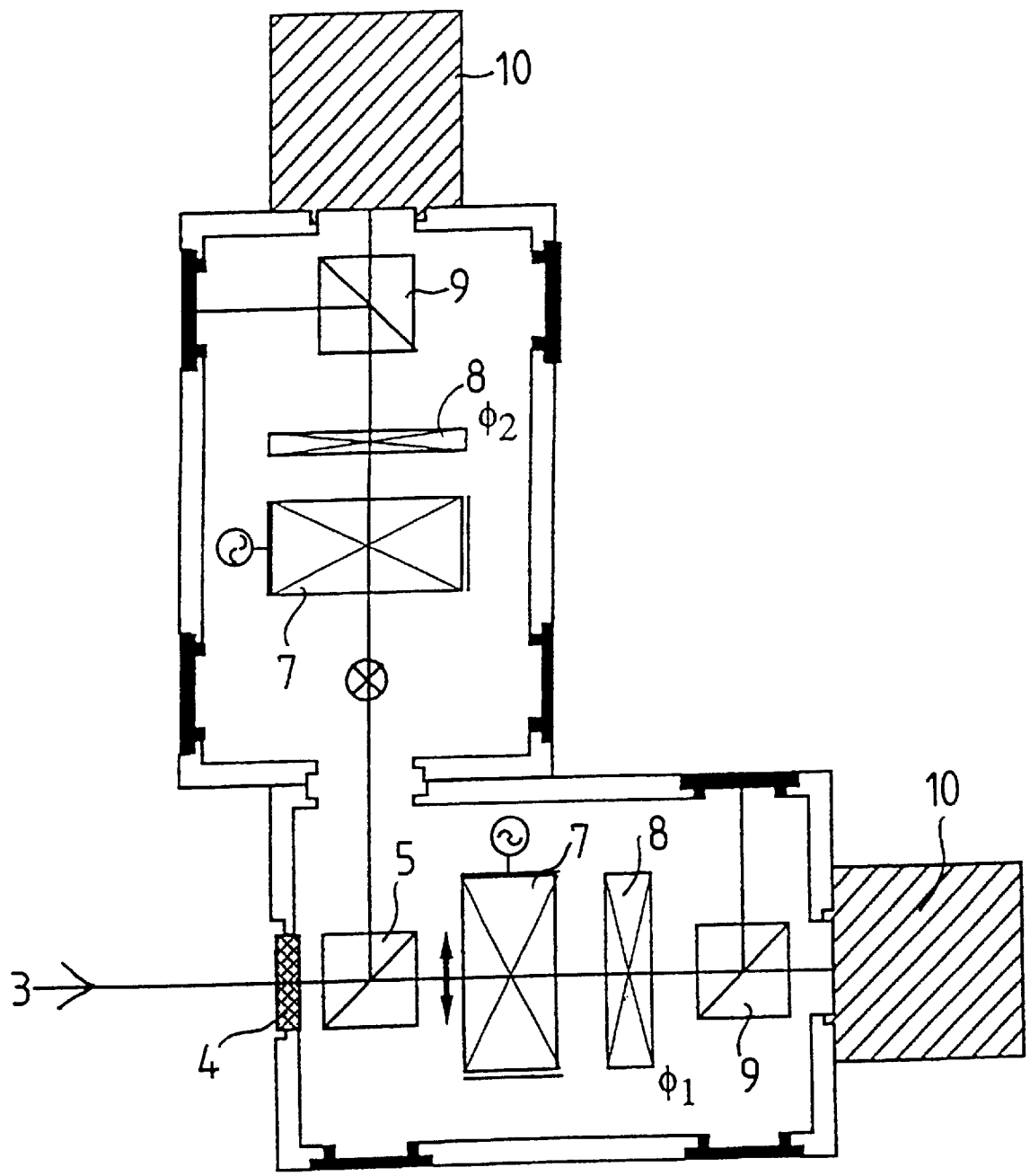
FIG. 5 is a schematic drawing showing two of the apparatus shown in FIG. 1 arranged to check for possible inconsistencies in inferred species temperature due to non-thermal effects.

In some applications, ions or atoms can exhibit a non-thermal velocity distribution function. The inferred fringe visibility will be altered from that expected for a thermal distribution. For example, a hot ion "tail" will cause an overestimate of the temperature of the "bulk" ions. To monitor for this effect, and in some circumstances compensate for it, it is possible to combine two apparatus of the invention as shown in FIG. 5 where again corresponding reference numerals are used to indicate similar components. Each apparatus uses a different phase offset $\phi_0$ tp estimate the fringe visibility. The degree of inconsistency in the inferred temperature is an indication of the importance of non-thermal effects. In circumstances where it is important to have more information about the ion distribution function, it is appropriate to use more sophisticated diagnostic tools such as laser induced fluorescence or possibly a high resolution grating-based spectrometer.

What is claimed is:

1. An apparatus for measurement of at least one of brightness, flow velocity and temperature of radiant media comprising means to direct a substantially collimated beam of light having a selected frequency from said media to a linear polarizer;
   an electro-optically active birefringent crystal to separate a linearly polarized output of said polarizer into two characteristic waves configured to introduce a first fixed phase delay between the characteristic waves;
   means to selectively electro-optically modulate said birefringent crystal to introduce a second variable phase delay between said characteristic waves; and
   means to combine said characteristic waves to interfere.

2. An apparatus as claimed in claim 1 wherein brightness, flow velocity and temperature are simultaneously measured.

3. An apparatus as claimed in claim 2 wherein the radiant media is an optically thin radiant media.

4. An apparatus as claimed in any one of claim 1 wherein the birefringent crystal is arranged with its propagation axes at 45° to the polarisation of the input so that substantially equal characteristic waves are transmitted.

5. An apparatus as claimed in any one of claim 1 wherein the characteristic waves are combined using a further linear polariser.

6. An apparatus as claimed in any one of claim 1 including a further tuning crystal disposed between the birefringent crystal and the means to combine to adjust the amount of first fixed delay.

7. An apparatus as claimed in claim 6 wherein two further tuning crystals are disposed in series between the birefringent crystal and the means to combine and one of the further crystals is fixed or rotated at a selected rate perpendicular to its optical axis so as to provide a scanning of the delay range.

8. An apparatus as claimed in any one of claim 1 wherein the birefringent crystal is a Lithium Niobate crystal.

9. An apparatus as claimed in any one of claim 1 further including means to detect the combined characteristic waves and means to sample the wave at an interval of one quarter of the modulation period of the birefringent crystal to produce a digitised signal from which the emission moments of the radiant media can be recovered.

10. A method for measurement of at least one of brightness, flow velocity and temperature of radiant media including the steps of linearly polarising a substantially collimated beam of light having selected frequency from said radiant media;
    separating said polarised beam into two characteristic waves and introducing a first fixed phase delay between said characteristic waves;
    introducing a second modulated variable phase delay between said characteristic waves of selected frequency and selected amplitude; and
    combining said characteristic waves and sampling the combined wave at an interval of one quarter of the modulation period to produce a digitised signal from which the emission moments of the radiant media can be recovered.

11. A method as claimed in claim 10 wherein brightness, flow velocity and temperature are simultaneously measured.

12. A method as claimed in claim 11 wherein the radiant media is an optically thin radiant media.

13. A method as claimed in claim 10 wherein a birefringent element is used to introduce the fixed delay.

14. A method as claimed in claim 13 wherein an electro-optically active birefringent crystal is used to introduce both the fixed delay and the variable delay.

15. A method as claimed in any one of claim 10 including recovering the emission moments using isolating time domain filters.

* * * * *

UNITED STATES PATENT AND TRADEMARK OFFICE
CERTIFICATE OF CORRECTION

PATENT NO.    : 6,462,826 B1
DATED         : October 8, 2002
INVENTOR(S)   : John Howard It is certified that error appears in the above-identified patent and that said Letters Patent is hereby corrected as shown below:

Title page, Item [54] and Column 1, lines 1-3,
Delete "MEASURESEMENT OF BRIGHTNESS, FLOW VELOCITY AND TEMPERATURE OF RADIANT MEDIA" and replace with -- METHODS AND APPARATUSES FOR MEASUREMENT OF BRIGHTNESS, FLOW VELOCITY AND TEMPERATURE OF RADIANT MEDIA --.

Title page,
Item [22], PCT Filed, delete the date "Jul. 16, 1999" and insert -- Jul. 16, 1998 --.

Column 5,
Line 54, delete "$\phi_o = \pi v_o BL/c = 2\pi v_o T_0$" and replace with -- $\phi_o = 2\pi v_o BL/c = 2\pi v_o T_0$ --.

Column 6,
Line 21, delete "$S_\pm = I_0\{1 \pm \eta \cos[\overline{\omega_0} + \omega_1 \sin \Omega t]\}$" and insert -- $S_\pm = I_0\{1 \pm \eta \cos[\overline{\varphi_0} + \varphi_1 \sin \Omega t]\}$ --.

Column 7,
Lines 11 and 13, delete "$\overline{\omega_0}$" And insert -- $\overline{\varphi_0}$ --.

Column 11,
Line 1, delete "$I(T_e)n_e n_s \exp(-\chi lkT_e)/v\overline{(T_e)}$" and insert -- $I(Te) \propto n_e n_s \exp(-\chi/kT_e)/\sqrt{(T_e)}$ --

Column 12,
Lines 3, 7, 10, 20 and 22, delete "any one of" between "in" and claim 1".
Line 55, delete "any one of" between "in" and "claim 10".

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,462,826 B1
DATED         : October 8, 2002
INVENTOR(S)   : John Howard It is certified that error appears in the above-identified patent and that said Letters Patent is hereby corrected as shown below:

<u>Title page,</u>
Item [73], delete "Australian National University" and replace with
-- The Australian National University --.

Signed and Sealed this

Twenty-sixth Day of August, 2003

JAMES E. ROGAN
*Director of the United States Patent and Trademark Office*